INVENTORS
WILLIAM H. SLOANE
GEORGE J. F. LEITL

United States Patent Office 3,020,109
Patented Feb. 6, 1962

3,020,109
TRACK ROLLER BEARINGS AND THE LIKE
William Hay Sloane, 12 Glenbrook Ave., East Malvern, Victoria, Australia, and George Johann Felix Leitl, 11 Alfred St., Kew, Victoria, Australia
Filed Sept. 22, 1959, Ser. No. 841,562
24 Claims. (Cl. 308—207)

This invention relates primarily to track roller bearing assemblies used for supporting and guiding the endless tracks on tracked vehicles such as tractors, tanks, excavators and the like, but may be applied equally advantageously to other machinery, such as the bearings for long conveyor belts, wherein the use of this type of bearing is desirable.

In general, these track roller bearings consist of a stationary shaft having suitable bearings thereon for rotatably supporting a somewhat tube like outer shell. This outer shell has a profile suitable for engaging and guiding the tracks of the vehicle and is provided with appropriate seals at both ends to reduce the loss of oil or grease from within the bearing cavity and to prevent the entry of grit or other foreign matter into the bearings.

Recent developments in this field have resulted in the design of a number of shock absorbing or shock resisting track roller bearing assemblies but previously known designs have possessed a number of inherent disadvantages.

One of these disadvantages arises from the fact that the bearings used to support the outer shell on the stationary shaft, have hitherto consisted of a pair of opposed tapered roller bearings provided with some form of spring influenced mechanism between the inner races or cones thereof in order to force the said cones into engagement with the outer races or cups of the bearings. The shock absorbing feature in this construction has been obtained by virtue of the fact that under extremely high load conditions the cups of the bearings, due to the taper thereon, are able to force the cones of the bearings inwardly against the action of the aforesaid spring influenced mechanism.

In forcing the cups of the bearings inwardly however, an extremely undesirable condition is produced wherein the shaft is no longer central within the outer shell. This has resulted in severe distortion, and therefore rapid wearing, of the seals provided between the said shaft and the outer shell.

In order to overcome this difficulty it is proposed according to the present invention to further guide and support the outer shell about the stationary shaft using additional bearings which may advantageously comprise a set of parallel plain roller bearings or the like, acting in conjunction with the aforesaid tapered roller bearings (or other suitable thrust resisting bearings) and which ensure that the outer shell will remain concentric with the said stationary shaft at all times.

Another disadvantage of existing shock absorbing track roller bearings results from the use of the spring mechanism to hold the cones of the tapered roller bearings in engagement with their respective cups. This is due to the fact that although these springs may exert considerable force to prevent the said cups withdrawing from the said cones, they exert little if any restraint on the axial movement of the outer shell along the stationary shaft. Thus, under the action of repeated shocks it has been found that the outer shell develops a condition known as "slogging," which consists of the rapid axial movement of the outer shell backwards and forwards along the stationary shaft. The vibration resulting from this condition is detrimental both to the bearings and to the aforesaid seals, and it is to the elimination of this characteristic that a further feature of this invention, is directed.

Accordingly the present invention provides a form of fluid damped shock absorber mechanism either in addition to, or replacing, the spring mechanism at present used to ensure the engagement of the cups of the bearings with their respective cones. This damping mechanism ensures that the axial movement of the outer shell relative to the stationary shaft will be retarded, or cushioned, and thus prevent the occurrence of damaging vibration or "slogging" due to high speed oscillation.

A further object of this invention is to incorporate the aforesaid features in a track roller bearing and in addition, to considerably reduce the complexity of the stationary shaft and its manufacturing cost.

These and other features of the invention will become readily apparent from the following description of a preferred embodiment of the invention and several modifications thereof wherein reference is made to the drawings accompanying the provisional specification in which.

Figure 1:
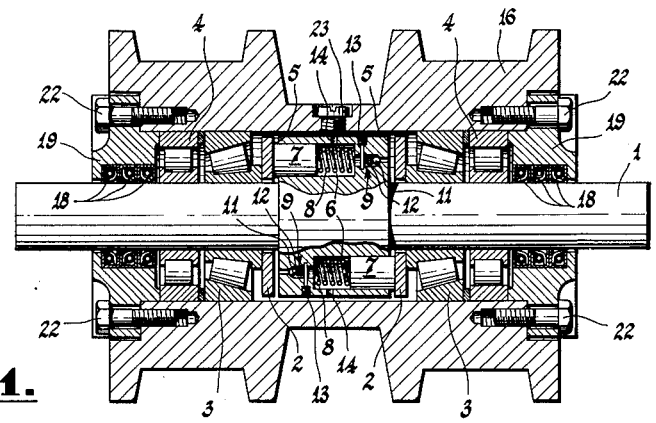
FIGURE 1 is a longitudinal section showing a track roller bearing constructed in accordance with the present invention.

FIGURE 1 shows a typical arrangement of the system consisting of a shaft 1 having a center section of larger diameter than the end or journal portions thereof, and on which is mounted, on each side of the said center section, a pressure washer 2, a tapered roller bearing 3 with the small end of the cone outermost, and a plain roller bearing 4 of the type having rollers guided by the inner race and free to move axially in the outer race.

The enlarged center portion of the shaft 1, which forms the shock absorber housing or body portions, has a series of circumferentially spaced cylindrical chambers or cylinders 6 extending inwardly from both shoulders 5 thereof. In order to conserve space, these cylinders may extend alternately from one shoulder and then from the other as shown. Each cylinder is provided with a piston 7, outwardly influenced by a spring 8 which causes the said pistons to bear against the pressure washers 2 which in turn force the cones of the tapered roller bearings 3 into engagement with their respective cups.

In addition, each cylinder is provided with a suitable non-return valve 9 which may advantageously comprise a ball 11, loaded with a spring 12 which is retained by a pin or like member 13. Also, a relatively small bleed orifice 14 is provided in each cylinder which, like the orifice for the non-return valve, communicates with the main cavity in the bearing.

The outer races of both the bearings 3 and 4 are preferably a tight fit in the outer shell 16 and are restrained from outward movement by suitable end plates 19, which may be attached by bolts 22 to each end of the outer shell 16 and which contain the necessary sealing means 18 to prevent loss of oil from within the bearing cavity and also to prevent the ingress of foreign matter into the bearing.

A suitable plug 23 may be provided in the outer shell 16 to enable the bearing cavity to be filled with sufficient oil or the like, to lubricate the bearings and also to provide fluid for the shock absorbing cylinders 6.

It will be appreciated from the foregoing description that when a load which has any component in the direction of the axis of the shaft 1, is applied suddenly to the outer shell 16, the cone of the tapered roller bearing which is receiving the load is able to slide axially along the shaft 1 and in so doing operate the pistons in the cylinders 6 against the damping action caused by the limited rate of escape of the fluid therein through the bleed holes 14.

This damping action occurs in either direction of travel of the outer shell 16, and may be readily regulated by adjusting the size of the bleed holes 14. The limit of axial movement of the shaft 1 in either direction is of course reached when the appropriate thrust washer 2 is against its respective shoulder 5 of the enlarged center portion of the said shaft.

It will be appreciated that the use of the plain roller bearings 4 prevents any possibility of axial displacement of the said outer shell and the stationary shaft 1 while the aforesaid shock absorbing action takes place. It will also be seen that the use of the fluid-damped shock absorbers prevents rapid oscillatory movement of the outer shell 16 along the stationary shaft 1. This eliminates the so-called "slogging" effect, with its associated damaging vibration and shock to the bearings which is caused by fluctuating shock loads on the outer shell 16.

It will be further appreciated that, in previous constructions wherein purely spring action was used between the cones of the tapered roller bearings 1, if a sufficiently large shock load was encountered the resistance offered by the springs would not be sufficient to prevent the shock being transmitted to the bearings when the said springs reached the limit of their travel. The only method by which this limitation could be overcome in these bearings was to increase the spring force between the said cones of the tapered roller bearings, but this however introduces the serious defect of reducing the thrust carrying capacity of the said bearings by providing them with a high initial load.

With the construction according to this invention however, the only limit to the magnitude of the shock which will be absorbed, is determined by the actual physical strength of the components involved, and also, the preloading of the tapered roller bearings is reduced to a minimum since the springs 8 need only be comparatively light, their main function being to return the pistons 7 to their extended positions.

In addition to the aforesaid features, this construction also renders the bearings 3 self adjusting, since any wearing of these bearings will be automatically compensated by the springs 8. Also the radial load carrying capacity of the bearing assembly is greatly increased since far higher radial loads are permissible for plain roller bearings than for tapered roller bearings of comparable size.

Figure 2:
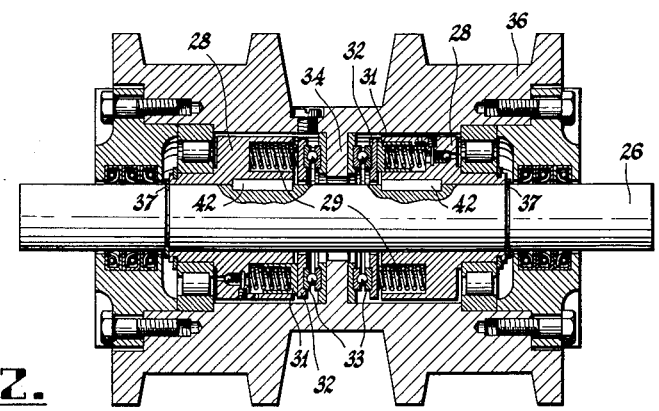
FIGURE 2 is a view similar to FIGURE 1 but showing a modification.
Figure 3:
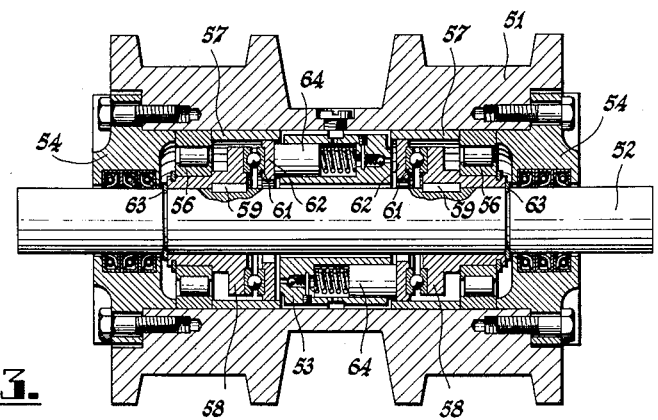
FIGURE 3 is a view similar to FIGURES 1 and 2 but showing a further modification.

FIGURES 2 and 3 illustrate modifications of the aforesaid invention in which the tapered roller bearings used therein are replaced by suitable ball or roller plain thrust bearings.

Referring firstly to FIGURE 2, a shaft 26 has plain roller bearings or the like mounted on members 28 which form the shock absorber housings or body portions and which are connected to the said shaft for example, by the keys 42, and which are limited in outward movement along the shaft by suitable means such as the spring clips 37.

These members 28 each have a circumferentially spaced series of inwardly facing shock absorbing devices which may be of the same construction as those previously described with reference to FIGURE 1. The pistons 31 associated with these shock absorbing devices bear on pressure rings 32, which in turn hold the thrust bearings 33 in engagement with both radial faces of the shoulder 34 on the outer shell 36.

Referring now to FIGURE 3 which illustrates a further modification of the invention in which, as in FIGURE 2, plain thrust bearings are used in conjunction with plain parallel roller bearings or the like. In this modification a shock absorber housing or body portion 53, free to rotate about the shaft 52, is positioned on the said shaft between a pair of ball or roller thrust bearings 61 or their equivalent. The body portion 53 is provided with a circumferentially spaced series of shock absorbing devices constructed substantially as described with reference to FIGURE 1, and alternately facing in opposite directions. This cylinder block is preferably located and clamped within the outer shell 51 by end flanges 54, acting through and clamping the outer race of the plain roller bearings 56, and the spacer tubes 57. The inner races of the plain roller bearings 56 are mounted on sleeve members 58, connected to the shaft 52 by the keys 59 or other suitable devices and limited in outward movement therealong by suitable retaining devices such as the spring clips 63. On the inner face of each of the members 58 is mounted concentrically one race of each thrust bearing 61. The opposing race of each thrust bearing is mounted in a pressure ring 62, slidable in the spaced tubes 57, against which the pistons 64 associated with the shock absorbers contained in the body portion 53 act to hold the races of the thrust bearings 61 in engagement.

Both the modifications described in FIGURES 2 and 3 may be provided with suitable means to enable the introduction of sufficient fluid into the bearing assembly to both lubricate the bearings and supply fluid to the shock absorbing cylinders. This means may conveniently consist of a filler plug in the outer casing similar to that previously described with reference to FIGURE 1.

It will be readily appreciated that both the modifications shown in FIGURES 2 and 3 possess the same features regarding shock absorbing qualities, prevention of axial misalignment of the central shaft and the outer shell, and freedom from "slogging" as does the bearing described in FIGURE 1. The use of the plain ball or roller thrust bearings in these two modifications however, enables the bearing assembly to withstand far higher axial loads than is possible when tapered roller bearings are used, since plain ball or roller thrust bearings have a far greater axial load capacity than tapered roller bearings of comparable size.

The use of the plain ball or roller thrust bearings as in the modifications shown in FIGURES 2 and 3 overcomes an additional disadvantage possessed by previously known constructions wherein tapered roller bearings have been used, namely, that in order to achieve the shock absorbing feature it has been the practice to have the cones of the said tapered roller bearings slidable axially along the central shaft. This action is most undesirable since, in addition to unnecessary wearing of the shaft and the bore of the bearing cone, the said bearing cones could not be fitted to the shaft with tolerances in accordance with the bearing manufacturers' recommendations The bearing assembly shown in FIGURE 1 overcomes this disadvantage to some extent in that a large portion of the radial load is supported by the plain ball or roller bearings, thereby reducing the friction between the cones of the tapered roller bearings and the central shaft and thus the wearing of the associated portions thereof. The modifications shown in FIGURES 2 and 3 however, completely eliminate this disadvantage in that there are no sliding components on the central shaft, and also, both the inner and outer races of all the bearings used may be tightly fitted to their associated members as recommended by the bearing manufacturers.

The bearing assemblies shown in FIGURES 2 and 3 possess yet another feature in that the shaft used therein is of very simple construction, being in fact almost a plain shaft, and consequently the manufacturing time and costs thereof are reduced accordingly. The bearing depicted in FIGURE 3 possesses a further feature in that in addition to enabling the use of a substantially plain central shaft as in FIGURE 2, the main bore of the outer shell is also plain and does not require any shoulders or grooves therein, which again simplifies manufacture.

It will be appreciated, of course, that with any of the preceding embodiments of the invention, the fluid damped shock absorbing mechanisms therein may be alternated circumferentially with plain compression springs if this construction is more suitable or convenient for the particular application. This arrangement is depicted in FIGURE 2 wherein the said plain compression springs 29 are recessed into cylinders in the members 28. The actual number and size of the shock absorbing mechanisms and/or the plain compression springs provided in the bearing assembly will, of course, be determined by the magnitude of the shock loads which are likely to be experienced, but, by way of example, it is considered that for a typical application of the bearing shown in FIGURE 1 five shock absorbing cylinders facing in each direction would be a suitable number.

Having now described our invention, what we claim as new and desire to secure by Letters Patent is:

1. A bearing assembly for supporting and locating a shell concentrically about a shaft extending therethrough comprising a pair of longitudinally spaced bearings adapted to resist substantially radial loads only, a pair of anti-friction thrust bearings located between the said radial load resisting bearings and adapted to resist axial loads, and a fluid damped shock absorbing device provided between said shaft and said shell, said thrust bearings being tapered roller bearings arranged to have the axes of their rollers convergent outwardly of the bearing, and said fluid damped shock absorbing device including a housing fast with the said shaft and positioned between the said tapered roller bearings, a series of circumferentially spaced cylinders extending longitudinally and oppositely directed from each end of said housing toward the said tapered roller bearings, each of said cylinders containing a spring urging the rollers of said tapered bearings into engagement with their respective cups.

2. An improved bearing assembly in accordance with claim 1 and wherein at least one of said cylinders extending in each direction is provided with a piston urged outwardly by said spring, a one-way valve adapted to admit hydraulic fluid to the cylinder and a bleed passage communicating with an internal cavity of the said shell, said cavity at least in the region of the shock absorbing device being charged with hydraulic fluid.

3. An improved bearing according to claim 2 wherein the cylinders provided with fluid damping means are alternated circumferentially with those containing the spring means only.

4. An improved bearing in accordance with claim 2 wherein the said one-way valve includes a passage from said cylinder communicating with said internal cavity, a spring loaded ball, and a valve seat.

5. An improved bearing according to claim 2 wherein the shell has end plates attached thereto, said end plates being provided with sealing means in the region of the said shaft and wherein the cavity enclosed by the shell and the end plates is charged with a fluid suitable for both lubricating the bearings and supplying fluid to the damping cylinders.

6. An improved bearing according to claim 2 wherein thrust or pressure washers are provided between the said thrust bearing means and the piston associated with the said shock absorbing device.

7. An improved bearing according to claim 2 wherein said radial load carrying bearings are of the plain roller type having the inner race free to move longitudinally within the outer race.

8. A bearing assembly for supporting and locating a shell concentrically about a shaft extending therethrough comprising a pair of longitudinally spaced bearings adapted to resist substantially radial loads only, a pair of anti-friction thrust bearings located between the said radial load resisting bearings and adapted to resist axial loads, and a fluid damped shock absorbing device provided between said shaft and said shell, said thrust bearings each being one of a ball or roller bearing type arranged for resisting axial thrust loads only and including a pair of races, a flange projecting inwardly from said shell, said thrust bearings being located one on each side of said flange, the races of said bearings which are adjacent said flange being drivingly connected to said shell, the races of said bearings remote from said flange being urged inwardly by springs associated with the shock absorbing device, said device including a pair of body portions each located adjacent to one of said thrust bearings on the opposite side thereof to the aforesaid flange and provided with a circumferentially spaced series of cylinders directed inwardly towards said thrust bearings, each of said cylinders being provided with a spring directed against its associated thrust bearing, said body portions being fast with said shaft.

9. An improved bearing in accordance with claim 8 and wherein at least one of said cylinders in each body portion is provided with a piston outwardly influenced by said spring, a one-way valve adapted to admit hydraulic fluid to the cylinder and a bleed passage communicating with an internal cavity of the shell, said cavity at least in the region of the shock absorbing device being charged with hydraulic fluid.

10. An improved bearing in accordance with claim 9 wherein each of the said shock absorber body portions is provided with an outward extension on which the inner races of the radial load carrying bearings are fitted.

11. An improved bearing in accordance with claim 9 wherein the cylinders provided with fluid damping means are alternated circumferentially with those containing the spring means only.

12. An improved bearing in accordance with claim 9 wherein the said one-way valve includes a passage from said cylinder communicating with said internal cavity, a spring loaded ball, and a valve seat.

13. An improved bearing according to claim 9 wherein the outer shell has end plates attached thereto, said end plates being provided with sealing means in the region of the said shaft and wherein the cavity enclosed by the outer shell and the end plates is charged with oil or other fluid suitable for both lubricating the bearings and supplying fluid to the damping cylinders.

14. An improved bearing according to claim 9 wherein thrust or pressure washers are provided between the said thrust bearing means and the piston or springs associated with the said shock absorbing device.

15. An improved bearing according to claim 9 wherein said radial load carrying bearings are of the plain roller type having the inner race free to move longitudinally within the outer race.

16. A bearing assembly for supporting and locating a shell concentrically about a shaft extending therethrough comprising a pair of longitudinally spaced bearings adapted to resist substantially radial loads only, a pair of anti-friction thrust bearings located between the said radial load resisting bearings and adapted to resist axial loads, and a fluid damped shock absorbing device provided between said shaft and said shell, said thrust bearings each being one of a ball or roller bearing type arranged for resisting axial thrust loads only and including a pair of races, one race of each of said thrust bearings being drivingly connected with said shaft, the other race of each of said thrust bearings being connected to said shell through said shock absorbing device, said device including a pair of body portions fast with said shell, said thrust bearings being positioned on either side of said body portions, a circumferentially spaced series of longitudinally extending cylinders oppositely directed from each end thereof in said body portions toward the said thrust bearings, each of said cylinders containing a spring acting upon the respective races of the thrust bearings adjacent said body portions.

17. An improved bearing in accordance with claim 16 and wherein at least one of said cylinders extending in each direction is provided with a piston outwardly influenced by said spring, a one-way valve adapted to admit hydraulic fluid to the cylinder, and a bleed passage communicating with an internal cavity of the shell, said cavity being charged with hydraulic fluid.

18. An improved bearing in accordance with claim 17 and wherein the races of said thrust bearings which are fast with said shaft are carried on collars also fast with said shaft, said collars being provided with mounting means for attachment of the inner races of said radial load resisting bearings.

19. An improved bearing according to claim 17 wherein the cylinders provided with fluid damping means are alternated circumferentially with those containing the spring means only.

20. An improved bearing in accordance with claim 17 wherein the said one-way valve includes a passage from said cylinder communicating with said internal cavity, a spring loaded ball, and a valve seat.

21. An improved bearing according to claim 17 wherein the outer shell has end plates attached thereto, said end plates being provided with sealing means in the region of the said shaft and wherein the cavity enclosed by the outer shell and the end plates is charged with oil or other fluid suitable for both lubricating the bearings and supplying fluid to the damping cylinders.

22. An improved bearing according to claim 17 wherein thrust or pressure washers are provided between the said thrust bearing means and the piston associated with the said shock absorbing device.

23. An improved bearing according to claim 17 wherein said radial load carrying bearings are of the plain roller type having the inner race free to move longitudinally within the outer race.

24. A bearing assembly for supporting and locating a shell concentrically about a shaft extending therethrough comprising a pair of longitudinally spaced bearings adapted to resist substantially radial loads only, a pair of anti-friction thrust bearings located between the said radial load resisting bearings and adapted to resist axial loads, and a fluid damped shock absorbing device provided between said shaft and said shell, said shock absorbing device including a housing fast with one of said shaft and shell, a series of circumferentially spaced cylinders extending axially and oppositely directed from each end of said housing toward the thrust bearings, each of said cylinders containing a spring urging outwardly toward the adjacent thrust bearing, at least one of said cylinders extending in each direction being provided with a piston, a one-way valve adapted to admit hydraulic fluid to the cylinder and a bleed passage communicating with an internal cavity of the said shell, said cavity at least in the region of the shock absorbing device being charged with hydraulic fluid.

References Cited in the file of this patent

UNITED STATES PATENTS

| | | |
|---|---|---|
| 1,152,689 | Ashton | Sept. 7, 1915 |
| 1,421,208 | Gauldie | June 27, 1922 |
| 2,255,675 | Nygren | Sept. 9, 1941 |
| 2,344,571 | Turrettini | Mar. 21, 1944 |
| 2,671,700 | Seyffert | Mar. 9, 1954 |
| 2,941,853 | Bartholomous | June 21, 1960 |

FOREIGN PATENTS

| | | |
|---|---|---|
| 50,922 | Sweden | Jan. 3, 1920 |